United States Patent
Resios

(10) Patent No.: US 10,649,768 B1
(45) Date of Patent: May 12, 2020

(54) DEVELOPMENT CODE EXECUTION USING A SERVICE PROXY

(71) Applicant: Amazon Technologies, Inc., Seattle, WA (US)

(72) Inventor: Andreas Resios, Iasi (RO)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 15/919,043

(22) Filed: Mar. 12, 2018

(51) Int. Cl.
- *G06F 8/70* (2018.01)
- *G06F 11/36* (2006.01)
- *H04L 29/08* (2006.01)
- *G06F 9/455* (2018.01)

(52) U.S. Cl.
CPC ............ *G06F 8/70* (2013.01); *G06F 9/45558* (2013.01); *G06F 11/3664* (2013.01); *H04L 67/2814* (2013.01); *H04L 67/2861* (2013.01); *G06F 2009/45575* (2013.01)

(58) Field of Classification Search
CPC .... G06F 8/70; G06F 9/45558; G06F 11/3664; G06F 2009/45575; H04L 67/2814; H04L 67/2861
USPC ................................................ 717/120–135
See application file for complete search history.

(56) References Cited

U.S. PATENT DOCUMENTS

| | | | | |
|---|---|---|---|---|
| 9,203,931 B1 * | 12/2015 | Ngo | ........................ | H04L 67/28 |
| 9,258,335 B1 * | 2/2016 | Taylor | ................. | H04L 65/1069 |
| 2003/0163600 A1 * | 8/2003 | Lankinen | .............. | G06F 9/5055 719/318 |
| 2004/0122720 A1 * | 6/2004 | Mikalsen | ............... | G06Q 30/02 709/203 |
| 2005/0033751 A1 * | 2/2005 | Maron | ................ | G06F 11/3495 |
| 2006/0047496 A1 * | 3/2006 | Genkin | ................. | H04L 41/145 703/22 |
| 2012/0226737 A1 * | 9/2012 | Rajaraman | .......... | G06F 9/44526 709/203 |
| 2014/0075053 A1 * | 3/2014 | Kolathur | ................. | G06F 8/447 710/10 |
| 2016/0352782 A1 * | 12/2016 | Patil | ...................... | H04L 65/105 |
| 2017/0026481 A1 * | 1/2017 | Stephan | ............. | H04L 67/2814 |
| 2018/0375950 A1 * | 12/2018 | Walker | ............... | H04L 67/2814 |

OTHER PUBLICATIONS

Spiess et al., "SOA-based Integration of the Internet of Things in Enterprise Services," 2009, IEEE, p. 968-975. (Year: 2009).*

* cited by examiner

*Primary Examiner* — Qing Chen
(74) *Attorney, Agent, or Firm* — Thorpe North & Western, LLP.

(57) ABSTRACT

A technology is described for redirecting a service request to a service proxy on a software development host. An example method may include receiving a service request directed to a service hosted in a service provider environment. In receiving the service request, a determination may be made that a service proxy simulates the service on a software development host, and that the service proxy may be used to execute development code on the software development host. In response, the service request may be redirected to the service proxy on the software development host for handling of the service request.

20 Claims, 10 Drawing Sheets

DEVELOPMENT CODE EXECUTION USING A SERVICE PROXY

BACKGROUND

Service oriented architecture is an approach used to provide a software architecture that is based upon the use of services. A service may be a discrete unit of functionality that can be accessed through a communication protocol over a network and acted upon and updated independently. For example, a service, such as RESTful Web service, may be used to perform a function, such as producing data, validating a customer, or providing simple analytical services. Service oriented architecture allows software developers to combine the functionality of services to form applications, which can be built from services combined in an ad hoc manner.

Software developers commonly perform many iterations of software changes prior to deploying the changes to a production environment, such as a service provider environment that hosts services providing a service oriented architecture. For example, a developer may iteratively change the source code of an application, build the application, deploy the application to a service oriented architecture environment, and perform tests on the application in the service oriented architecture environment. This process can be time consuming and inefficient, particularly when developing applications that execute in service oriented architecture environments and/or in a service provider environment.

DETAILED DESCRIPTION

Figure 1:
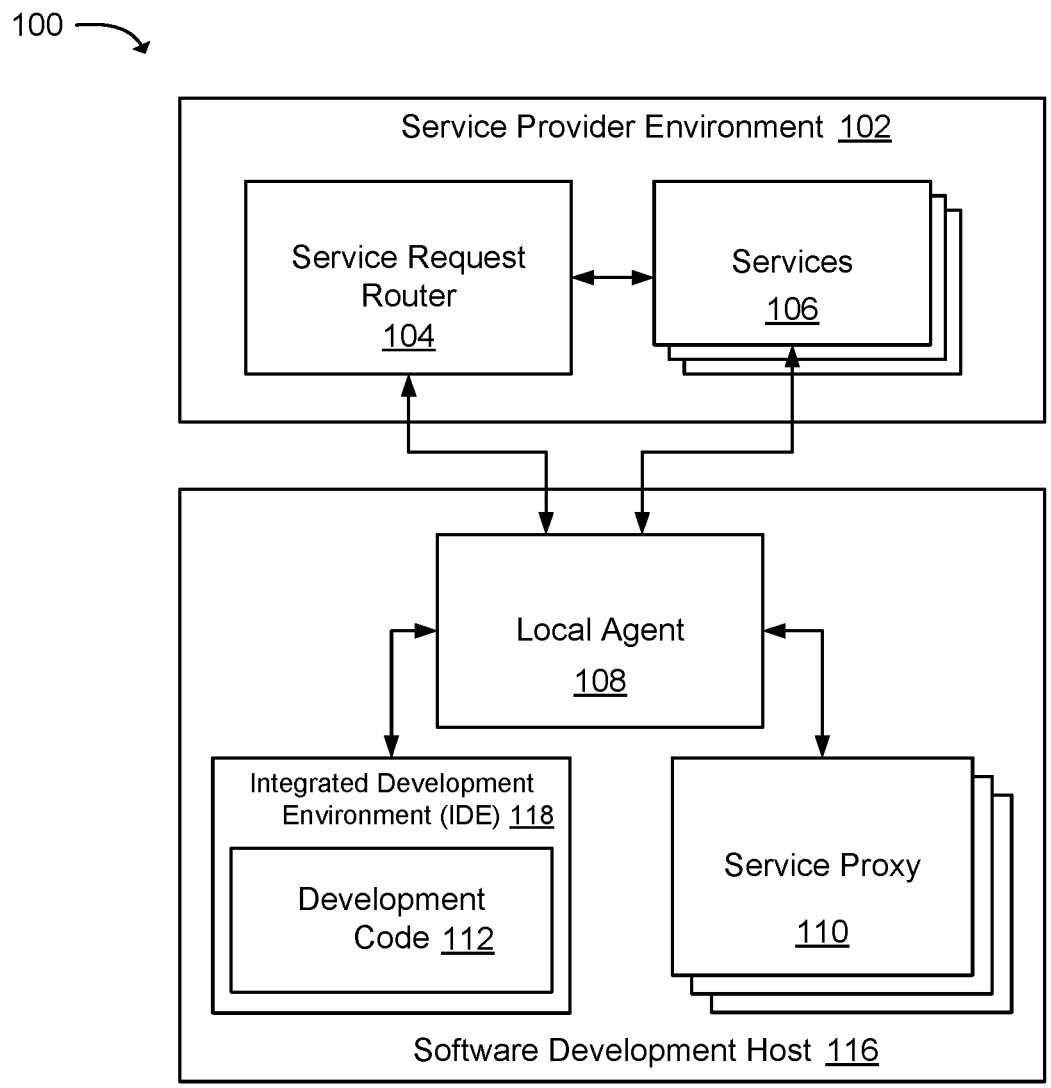
FIG. 1 is a block diagram illustrating an example software development system for executing development code using a service proxy to simulate a service included in a service provider environment.

Technologies are described for redirecting a service request or event notification to a service proxy that simulates a service that would reside in a service provider environment. A service proxy may be a complete or partial simulation of a service hosted in a service provider environment. The service proxy may be local to a software development host that provides a hybrid development environment for testing development code. The software development host may be a physical client device or a local computing instance (e.g., virtual machine) and the hybrid development environment may include the service proxy located on the software development host, a service request router in the service provider environment, and one or more services located in a service provider environment. The hybrid development environment provided via the software development host may be used to test development code prior to deploying the development code to the service provider environment that includes the actual service that is being simulated by the service proxy.

In one example, a software developer may test development code on a software development host using a service proxy to execute the development code and/or simulate service requests generated by the development code. Software development tools provided by a development environment (e.g., an integrated development environment ("IDE")) may allow the software developer to observe execution of the development code and identify and remove errors from the development code. The development code may include, for example, an application, an application component, or a program code function executable by a serverless computing service. When deployed to the service provider environment, the development code may be executable in the service provider environment and the development code may utilize one or more services located in the service provider environment.

Service requests or event notifications generated in association with testing development code on a software development host may be redirected to a service proxy that simulates a service to which the service request is directed. In this disclosure, examples of the technology described in reference to a service request may also be described in reference to an event notification.

In one example, a service request router may intercept service requests directed to the services located in the service provider environment and determine whether the service proxy that simulates the service is locally available on the software development host. In the case that the service proxy is locally available on the software development host, the service request router redirects the service request to the service proxy for handling of the service request. In the case that the service proxy for the service is not locally available on the software development host, the service request router forwards the service request to the appropriate service in the service provider environment.

In the past, software development may have involved iterations of deploying development code to a service provider environment for testing of the deployment code using services included as part of a service oriented architecture. Using the technologies disclosed herein, software developers can test development code more quickly and easily (e.g., by performing local debugging operations) using a service request router that redirects service requests to local service proxies on a software development host that simulate services included in a service oriented architecture. Consequently, the software development lifecycle for the deployment code can be completed more efficiently, thereby resulting in savings in the utilization of various types of computing resources such as, but not limited to, processor cycles, memory usage, and mass storage usage. Additionally, savings in service provider fees can be realized by testing development code locally on a software development host, as well as savings in power consumption as a result of more efficient use of computing resources during development that can be realized using the technologies disclosed herein.

To further describe the present technology, examples are now provided with reference to the figures. FIG. 1 is a block diagram illustrating a high level example of a system 100 used for software development that utilizes a service proxy 110 to simulate a service 106 provided using a service provider environment 102. As explained in detail below, as part of testing development code on a software development host 116, a service request directed to a service 106 located in the service provider environment 102 may be redirected to a service proxy 110 on the software development host 116, where the service proxy 110 simulates the service and handles the service request. As explained in more detail below, a service request router 104 may be used to redirect a service request originating in the service provider environment 102 to a service proxy 110 on the software development host 116, and a local agent 108 may be used to direct a service request originating on the software development host 116 to a service proxy 110 on the software development host 116. A software developer, who may be a customer of a computing service provider, may use the system 100 to create and test development code 112, and deploy the development code 112 to a service provider environment 102 managed by a computing service provider.

As illustrated, the system 100 may include a software development host 116 that is in network communication with a service provider environment 102. The software development host 116 may be a hardware computing device (e.g. a laptop or desktop computer) or a computing instance (e.g., "virtual machine") executing in a service provider environment 102 (discussed in detail below) located in a virtual private network ("virtual private cloud") logically isolated from other virtual networks in a service provider environment 102. The software development host 116 may be used to execute components of a development environment used to create, compile, execute, and test development code 112 intended for deployment to a service provider environment 102 (described in detail in relation to FIG. 9). The development host 116 may include an integrated development environment ("IDE") 118 that includes software development tools used by a software developer to observe execution of development code 112 and remove errors from the development code 112 prior to deploying the development code 112 to a service provider environment 102. Also, the software development host 116 may include credentials needed to communicate with services 106 in the service provider environment 102.

Development code 112 may include an application, application component, and/or program code function designed to execute within or in conjunction with services 106 hosted in a service provider environment 102. Illustratively, the services 106 (also referred to as "computing resources") may include services provided by: computing instances (e.g., virtual machines), data storage services, data streaming services, queueing services, messaging services, program code function resources, networking services, authentication services, machine learning services, as well as other types of computing resources. The services 106 may also be used for event driven computing where services 106 perform work in response to events triggered by other services and/or applications.

The service provider environment 102 may include services 106 that are managed and a service request router 104. The service request router 104 may be used to intercept service requests and/or event notifications that are generated within the service provider environment 102 and are directed to the services 106 located within the service provider environment 102. As part of intercepting a service request or event notification, the service request router 104 may identify a service 106 to which the service request or event notification is directed and determine whether a service proxy 110 for the service 106 may be available on the software development host 116. In one example, the service request router 104 may query a local agent 108 (described below) located on the software development host 116 to determine whether a service proxy 110 is available on the software development host 116. When a service proxy 110 is available on the software development host 116, the service request router 104 may redirect a service request or event notification to the service proxy 110 for handling of the service request or event notification. When a service proxy 110 is not available, the service request router 104 may forward a service request or event notification to a service 106 in the service provider environment 102 to which the service request or event notification is directed.

As indicated above, the software development host 116 may include a local agent 108. The local agent 108 may be used to manage local requests generated during execution of development code 112 on the software development host 116. For example, the local agent 108 may direct requests generated by executing development code 112 to services 106 located in the service provider environment 102, or to service proxies 110 that simulate the services 106 on the software development host 116. As part of managing the requests, the local agent 108 may determine whether a request is directed to a service 106 located in the service provider environment 102, and whether a service proxy 110 that simulates the service 106 is available on the software development host 116. Also, as described above, the local agent 108 may provide the service request router 104 located in the service provider environment 102 with information for service proxies 110 that are available on the software development host 116.

Figure 2:
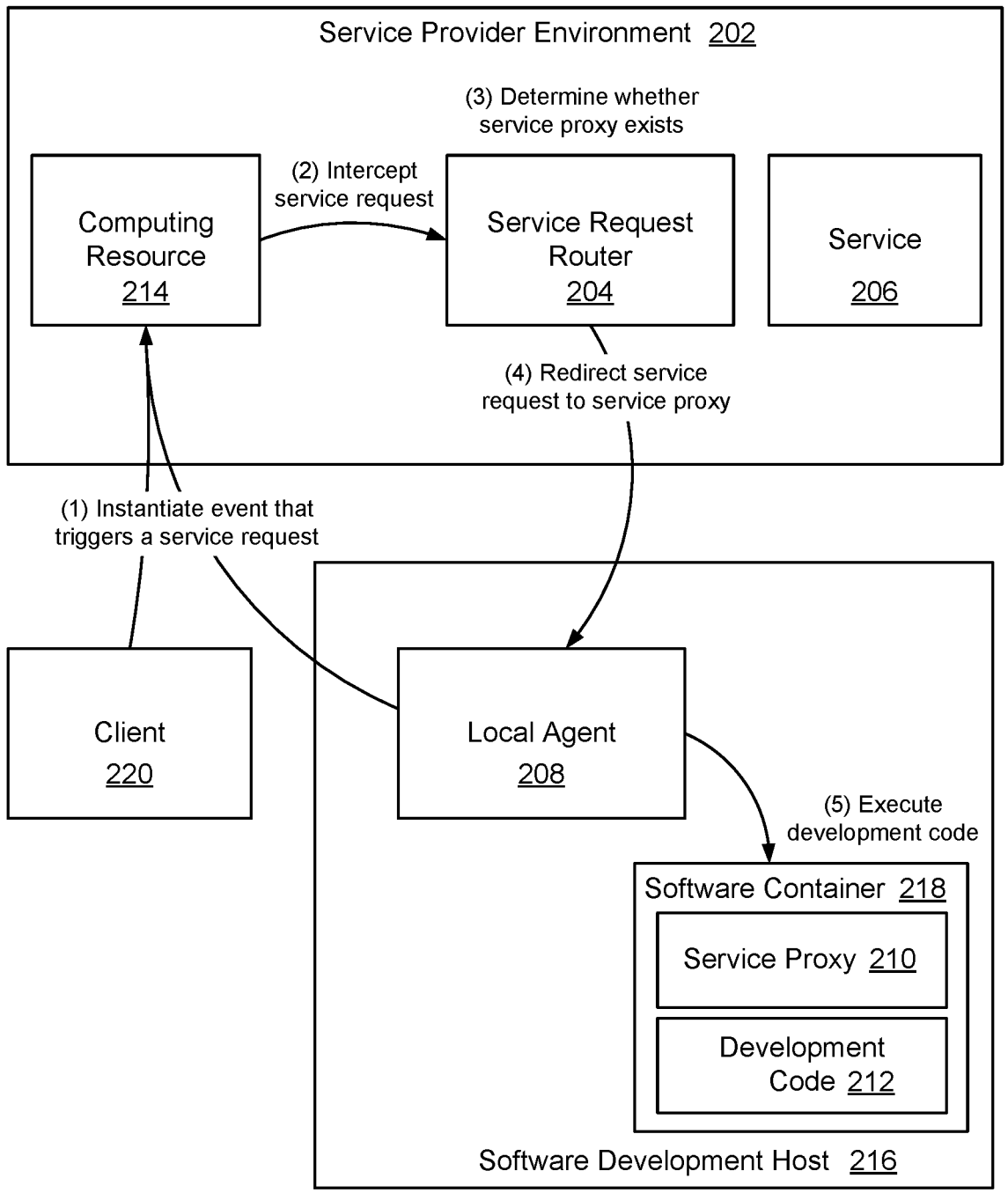
FIG. 2 is a diagram that illustrates an example software development system for executing development code on a software development host in response to a service request.

FIGS. 2-5 illustrate various methods for executing development code on a software development host using the present technology. FIG. 2 illustrates one example method for executing development code 212 on a software development host 216 using the system 100 described in FIG. 1. Namely, FIG. 2 illustrates executing development code 212, configured to be executed in response to an event generated in a service provider environment 202, on the software development host 216. For example, development code 212 may be executed on the software development host 216 by first instantiating an event in a service provider environment 202 that generates a service request directed to a service 206. The service request may be intercepted and redirected to the software development host 216, where the request is provided to a service proxy 210 that executes the development code 212, as described in greater detail below.

In the example illustrated, the development code 212 and the service proxy 210 may be executed using a software container 218. The software container 218 may provide an isolated environment for the service proxy 210 and the development code 212 by creating a virtual container in which development code and service proxy dependencies are contained. A software container or software container image may be a lightweight, stand-alone, executable software package that includes components needed to execute the software package, such as, for example, software code, runtime environment, system tools, system libraries, settings, etc.

The development code 212, that is ultimately executable by the service provider environment 202, may be tested on the software development host 216 using the service proxy 210 that simulates the service 206. Executing the development code 212 on the software development host 216 may allow a software developer to observe execution of the development code 212 using software development tools, and allow the software developer to remove errors from the development code 212 prior to deploying the development code 212 to the service provider environment 202 for use in a production environment.

In one configuration, the development code 212 may be for an event driven application or program code function. That is, the development code 212 may be for an application or program code function that is executed in response to an event that occurs within the service provider environment 202. For example, an event generated within the service provider environment 202 may cause a service request or event notification to be sent to the service 206 used to execute the application or program code function created using the development code 212, and in response to receiving the service request or event notification, the service 206 may execute the application or program code function. As a more specific example, storing data to a data store hosted in a service provider environment 202 may be an event that results in generating a service request to replicate the data store. The service request may be sent to an application (created using development code 212) that, in response to receiving the service request, creates a backup of the data store.

The software development host 216 may be used to test event driven development code 212. In one example, the local agent 208 located on the software development host 216, or a client 220 (e.g., a customer computing device, client software, an application, or another device), may be configured to initiate an event in the service provider environment 202 that causes a service request to be sent to a service 206 located in the service provider environment 202. For example, the local agent 208 or client 220 may instantiate the event by sending a request to a computing resource 214 located in the service provider environment 202 that triggers the event and causes the service request to be sent to the service 206. As an illustration, a software developer may initiate testing of development code 212 by instructing the local agent 208, via a software development user interface (not shown), to generate an event in the service provider environment 202. In response to the instruction, the local agent 108 may interact with a computing resource 214 (e.g., a data store, computing instance, queue service, etc.) located in the service provider environment 202, thereby causing an event to be generated that results in sending a service request to the service 206 located in the service provider environment 202.

As described earlier in association with FIG. 1, the service provider environment 202 may include a service request router 204 configured to intercept a service request sent to the service 206 and redirect the service request to the service proxy 210 located on the software development host 216 that simulates the service 206 in the service provider environment 202. In one example, the service request router 204 may monitor requests in the service provider environment 202 in order to identify requests associated with, for example, the development code 212, the software development host 216, a customer account, resource name, resource tag, or another identifier that associates the request with testing of the development code 212 on the software development host 216. As an illustration, the service request router 204 may monitor for a service request that has a unique identifier (e.g., a resource name), and classify the service request as being associated with a service proxy 210 and/or development code 212 located on the software development host 216. When a request associated with testing of the development code 212 is identified, the service request router 204 may intercept the request, and then make a determination whether a service proxy 110 that simulates the service 106 may be available on the software development host 116.

In one example, the service request router 204 may query the local agent 208 requesting information for a service proxy 210 that may be available on the software development host 216. In response to the request, the local agent 208 may determine whether the service proxy 210 is available on the software development host 216. For example, the local agent 208 may reference an IDE registry to determine whether the service proxy 210 is registered with the IDE. In the case that the software development host 216 includes the service proxy 210, the local agent 208 may respond to the service request router 204 indicating that the service proxy 210 is available on the software development host 216, and the service request router 204 may redirect the service request to the service proxy 210 on the software development host 216.

In another example, the service request router 204 may manage a registration record (shown in FIG. 6) that contains information for one or more service proxies available on the software development host 216. The service request router 204 may receive registrations (e.g., domain name system ("DNS") information) for service proxies available on the software development host 216, and the service request router 204 may add the registrations to the registration record. As part of intercepting a service request, the service request router 204 may query the registration record to determine whether a service proxy 210 may be available on the software development host 216, and in the case that the registration record indicates that the software development host 216 includes the service proxy 210, the service request router 204 may redirect the service request to the service proxy 210 on the software development host 216.

In one example, directing a service request to a service proxy 210 on the software development host 216 may include adding the service request to a service request queue (in the software development host or in the service provider environment), from which the local agent 208 on the software development host 216 may retrieve the service request. For example, after determining that a service proxy 210 is available on the software development host 216, the service request router 204 may add a service request to the service request queue. The local agent 208 on the software development host 216 may periodically poll the service request queue and retrieve a service request contained in the service request queue. The local agent 208 may then provide the service request to the service proxy 210 on the software development host 216. In another example, the service request may be pushed to the service proxy 210 on the software development host 216 using a push protocol.

In response to receiving the service request, the service proxy 210 may execute the development code 212, allowing a software developer to observe execution of the development code 212 using software development tools. In one example, in response to receiving a service request redirected to a service proxy 210, the local agent 108 may instantiate the service proxy 210 by launching a software container 218 containing the service proxy 210 and the development code 212. After launching the software container 218, the local agent 208 may provide the service request to the service proxy 210 included in the software container 218, and the service proxy 210 may execute the development code 212 allowing a software developer to observe execution of the development code 212 using software development tools.

Figure 3:
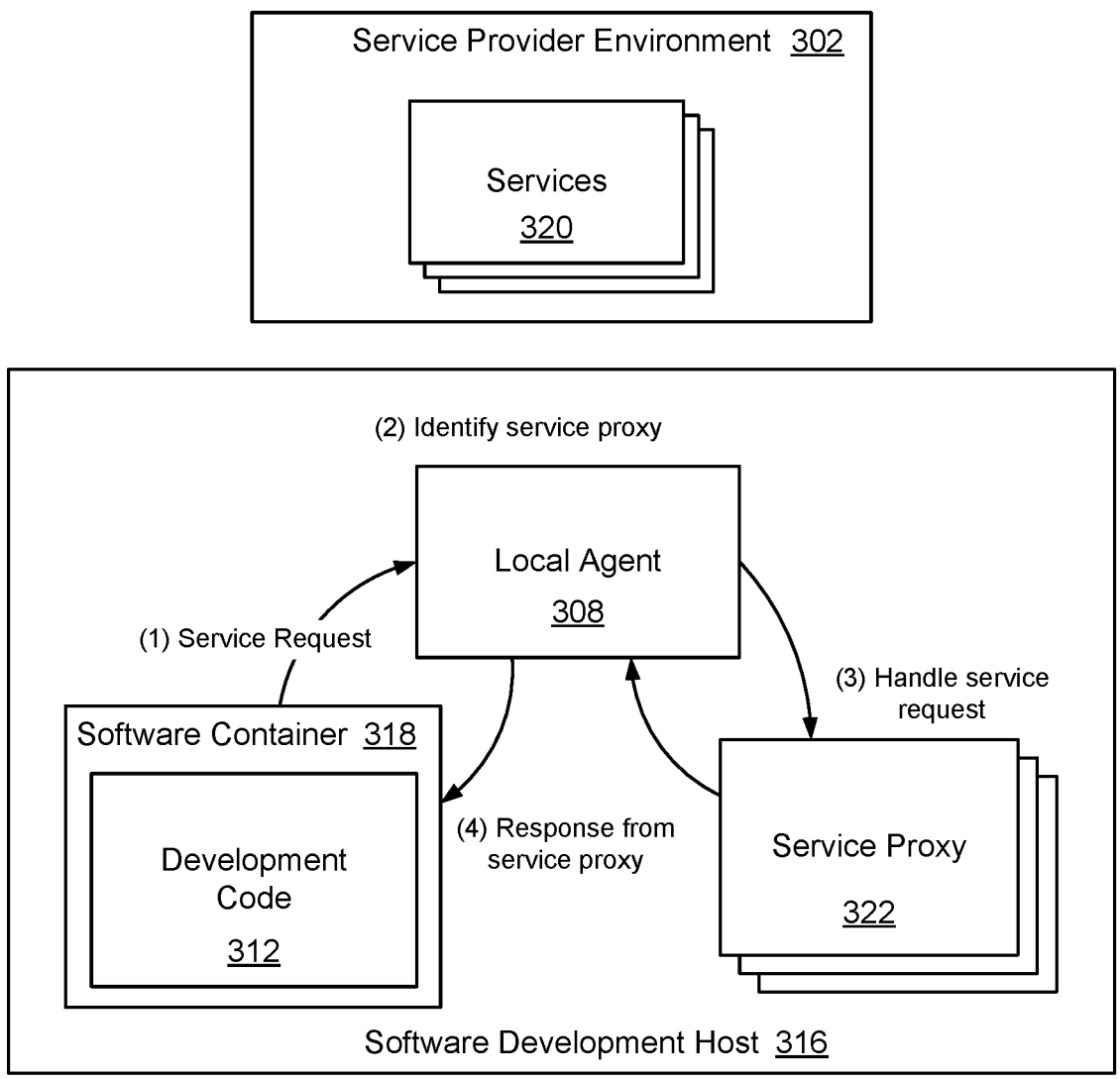
FIG. 3 is a diagram illustrating an example software development system for redirecting a service request generated by development code to a service proxy.

FIG. 3 illustrates an example method for redirecting a service request generated by development code 312 and directed to a service 320 in a service provider environment 302 to a service proxy 322 on a software development host 316. For example, development code 312, when executed on the software development host 316, may make service requests directed to other services 320 located in the service provider environment 302. However, the services may be simulated on the software development host 316 using service proxies 322. The service proxies 322 on the software development host 316 may be used to handle the service requests generated by the development code 312. For example, a service request that is generated by development code 312 and is directed to a service 320 hosted in the service provider environment 302 may be redirected to a service proxy 322 located on the development host 316. A response to the service request generated by the service proxy 322 may then be redirected back to the development code 312.

In one example, the local agent 308 may provide a local interface for directing service requests and responses generated on the software development host 316. For example, a service request generated by development code 312 and directed to a service 320 located in a service provider environment 302 may be sent to the local agent 308, which in response determines whether a service proxy 322 that simulates the service 320 may be available on the software development host 316. In the case that a service proxy 322 is available on the software development host 316, the local agent 308 redirects the service request to the service proxy 322 for handling of the service request. In one example, the local agent 308 may instantiate the service proxy 322 by launching an instance of the service proxy 322 on the software development host 316. For example, the local agent 308 may cause a software container to be instantiated on the software development host 316 that provides an isolated environment for the service proxy 322 to execute. A response generated by the service proxy 322 may be sent to the local agent 308, which redirects the response to the software container 318 containing the development code 312.

Figure 4:
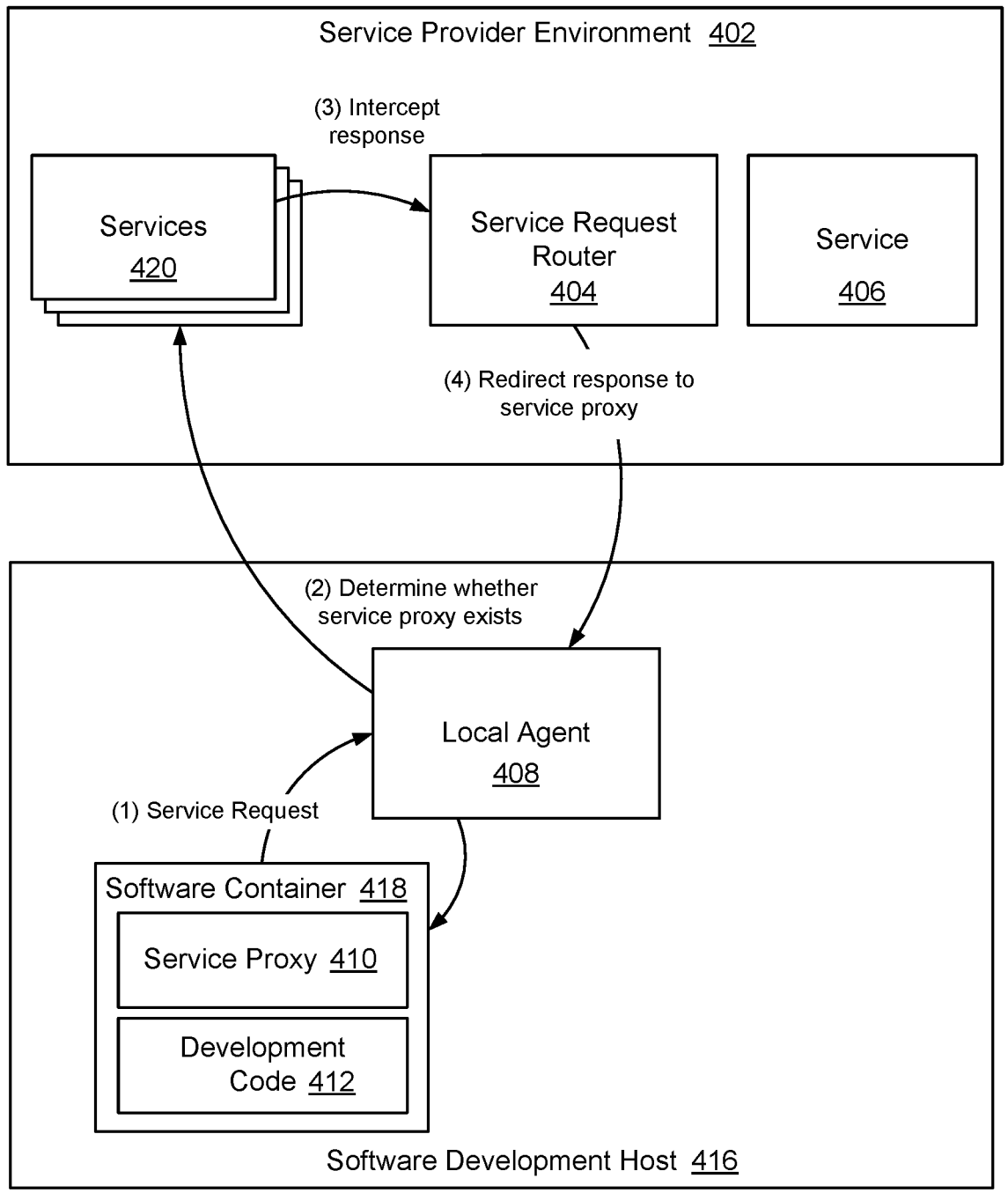
FIG. 4 is a diagram that illustrates an example software development system for forwarding a service request generated by development code to a service located in a service provider environment when a service proxy is not available.

FIG. 4 illustrates an example method for providing a service request generated by development code 412 executed on a software development host 416 to a service 420 located in the service provider environment 402 when a service proxy for the service 420 may be unavailable on the software development host 416. FIG. 4 also illustrates an example method for routing a response to the service request returned by the service 420 in the service provider environment 402 to the software development host 416 and a software container 418 containing the development code 412 that generated the service request.

In one example, development code 412 and a service proxy 410 used to simulate a service 406 located in a service provider environment 402 may be contained in a software container 418 located on the software development host 416. The development code 412, when executed, may generate a service request directed to a service 420 located in the service provider environment 402. The service request may be generated to appear to have originated from the service 406 located in the service provider environment 402, which the service proxy 410 simulates. The service request may be sent to a local agent 408 that provides an interface to the service 420 located in the service provider environment 402, as described earlier. The local agent 408 may forward the service request to the service 420 using credentials needed to send service requests to services located in the service provider environment 402.

In response to receiving the service request, the service 420 may return a response to the service request to the service 406 simulated by the service proxy 410. The service request router 404, as described earlier, may intercept the response to the service request and redirect the response to the software development host 416. In one example, the service request router 404 may monitor requests in the service provider environment 402 to identify requests associated with testing the development code 412, and intercept requests associated with testing the development code 412. The service request router 404 may then determine (e.g., via a query to the local agent 408) whether a service proxy 410 that simulates the service 406 is available on the software development host 416. When a service proxy 410, used to simulate the service 406, is available on the software development host 416, the service request router 404 may redirect the service request to the service proxy 410 on the software development host 416.

Figure 5:
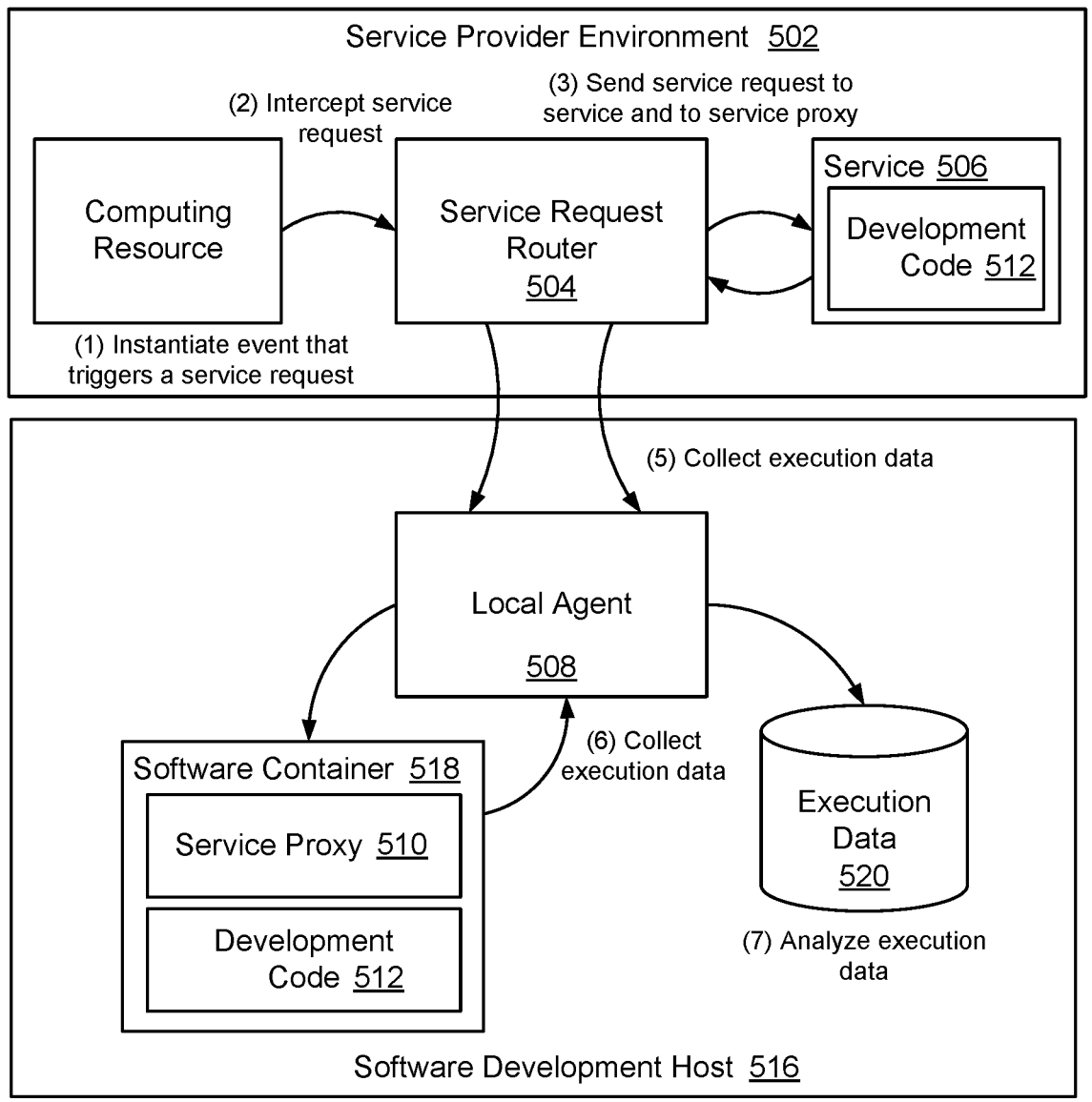
FIG. 5 is a diagram illustrating an example software development system for executing deployment code on a software development host and in a service provider environment.

FIG. 5 illustrates a method for executing development code 512 both on a software development host 516 and in a service provider environment 502 in order to collect, analyze, and compare execution data to isolate issues. In particular, FIG. 5 illustrates parallelizing an event in a service provider environment 502 that causes execution of development code 512 on a software development host 516 along with execution of the same development code 512 in a service provider environment 502, allowing a software developer to collect data from both the service provider environment 502 and the software development host 516 and analyze the data to isolate issues with the development code 512 and/or the execution environment. As illustrated, the software development host 516 may include a software container 518 that contains development code 512 and a service proxy 510 that simulates a service 506 used to execute the development code 512. Also, the development code 512 may be deployed to the service provider environment 502 for execution by the service 506. The development code 512 may be executed on the software development host 516 and in the service provider environment 502 by generating an event in the service provider environment 502, as described earlier in reference to FIG. 2, which causes a service request to be generated and intercepted by a service request router 504.

The service request router 504 may be instructed (e.g., via a local agent 508) to parallelize the service request by forwarding the service request to the service 506 that the service request is directed to, as well as redirecting the service request to the service proxy 510 on the software development host 516. The service 506 located in the service provider environment 502 may receive the service request and execute the development code 512. Execution data 520 associated with executing the development code 512 using the service 506 may be collected and the execution data 520 may be returned to the service request router 504. The service request router 504 may send the execution data 520 to the local agent 508 on the software development host 516 to be collected for analysis.

The service request redirected to the service proxy 510 may be provided to the local agent 508 on the software development host 516, and the local agent 508 may send the service request to the service proxy 510 contained in the software container 518. In response to receiving the service request, the service proxy 510 may execute the development code 512. Execution data 520 associated with executing the development code 512 using the service proxy 510 may be collected and the execution data 520 may be returned to the local agent 508 for collection and analysis. After executing the development code 512 in the service provider environment 502 and on the software development host 516, a software developer may analyze the execution data 520 to identify differences that may have occurred in execution of the development code 512 in order to isolate issues that may affect deployment of the development code 512 to production in the service provider environment 502.

Figure 6:
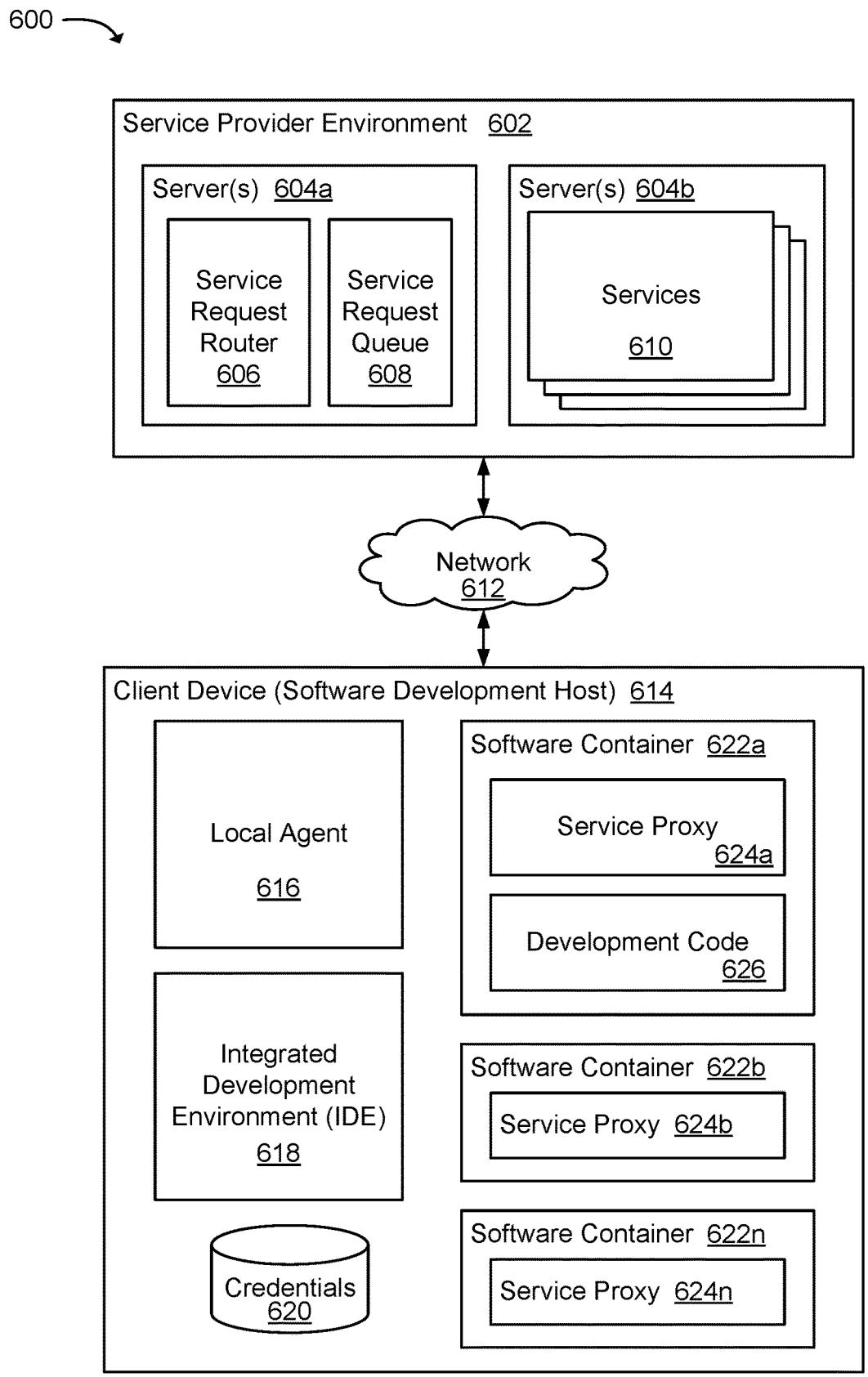
FIG. 6 is a block diagram that illustrates various example components included in a software development system for executing development code using a service proxy on a client device.

FIG. 6 illustrates components of an example system 600 on which the present technology may be executed. The system 600 may include a client device 614 used as a software development host that is in network communication with a service provider environment 602 that includes computing resources and managed services for supporting applications, application components, and/or program code functions developed on the client device 614.

As illustrated in FIG. 6, the service provider environment 602 may include one or more servers 604a used to host a service request router 606, and servers 604b used to host services 610. As described earlier, the service request router 606 may be configured to intercept and redirect service requests directed to services 610 in the service provider environment 602 to service proxies 624a-n on the client 614. In one example, the service request router 606 may redirect a service request to a service proxy 624a-n by adding the service request to a service request queue 608 located in the service provider environment 602, and a local agent 616 on the client device 614 may retrieve the service request from the service request queue 608 and submit the service request to a service proxy 624a-n. As will be appreciated, the servers 604a-b included in the service provider environment 602 may be physical servers and/or computing instances (e.g., virtual machines) hosted on physical servers.

The client device 614 may include components of a software development host used to create, compile, and execute development code 626 intended for deployment to the service provider environment 602. As illustrated, the client device 614 may include a local agent 616 configured to manage communications associated with executing development code 626, as described earlier. Also, the client device 614 may include an integrated development environment ("IDE") 618 that provides software development tools used by a software developer to observe execution of development code 626 and remove errors from the development code 626 prior to deploying the development code 626 to the service provider environment 602. The client device 614 may include credentials 620 used to communicate with the service request router 606 and services 610 in the service provider environment 602.

The client device 614 may host service proxies 624a-n that simulate services 610 in the service provider environment 602. Development code 626 designed to execute within or in conjunction with the services 610 provided by the service provider environment 602 may be tested using the service proxies 624a-n on the client device 614. The client device 614 may include software containers 622a-n. A software container or container image may be a lightweight, stand-alone, executable software package that includes the components needed to run the software package, such as, for example, the software code, runtime environment, system tools, system libraries, settings, etc. In one example, a software container 622a-n may be used to execute a service proxy 624a-n. In some examples, a software container 622a-n may be used to execute development code 626, including applications, application components, and/or program code functions.

Illustratively, an instance of a program code function may include a segment of program code that may be like a function, and the program code may receive parameters, perform processing, and provide return values. The service provider environment 602 may include serverless computing services that may be used to execute an instance of a program code function. Serverless computing services may comprise a platform for services that execute an instance of a program code function. That is, the instance of the program code function may execute on a physical host, computing instance, or in a software container that executes code in response to requests to run the instance of the program code function, and automatically manages compute resources used by the instance of the program code function. Once an instance of a program code function has been executed and results have been returned, the instance of the program code function and results may be removed from computer memory allocated for executing the instance of the program code function. A service proxy 624a located on the client device 614 may simulate a serverless computing service (e.g., service 610) used to execute an instance of a program code function, and the service proxy 624a may be used to test development code 626 designed to be a program code function that is deployed to the service provider environment 602.

A client device 614 may include any device capable of sending and receiving data over a network 612. A client device 614 may comprise, for example a processor-based system such as a computing device. A client device 614 may be a device such as, but not limited to, a desktop computer, laptop or notebook computer, tablet computer, mainframe computer system, handheld computer, workstation, network computer, or other devices with like capability.

A network 612 used for network communications between the client device 614 and the service provider environment 602 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

Figure 7:
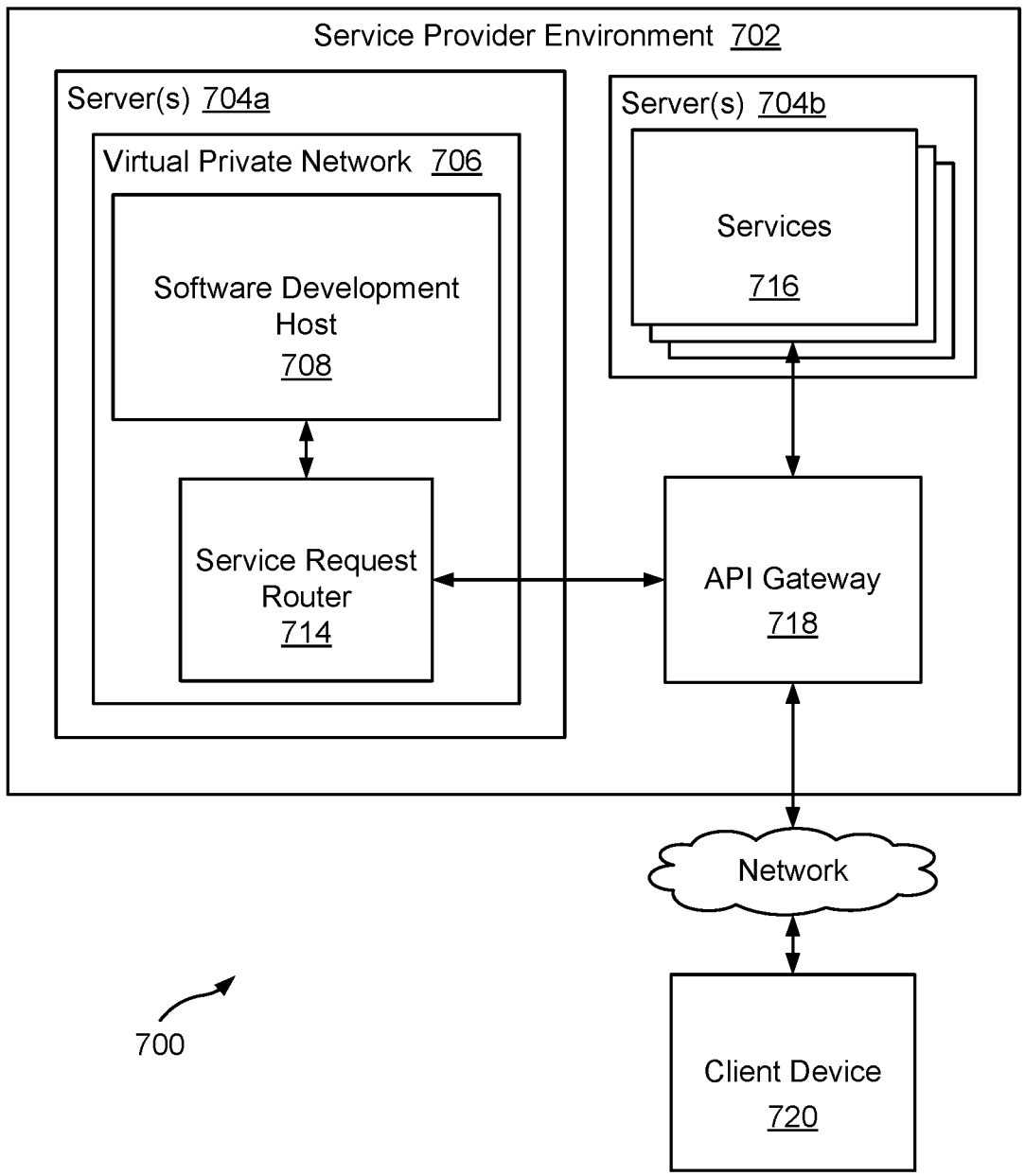
FIG. 7 is a block diagram that illustrates various example components included in a software development system for executing development code using a service proxy on a software development host implemented in a virtual private network.

FIG. 7 illustrates an example system 700 used to implement a software development host 708 and a service request router 714 in a virtual private network 706 located in a service provider environment 702. A virtual private network 706 (e.g., a "virtual private cloud") may be created for a customer of a computing service provider and the virtual private network 706 is logically isolated from other virtual networks in the service provider environment 702. The service provider environment 702 may include servers 704a used to host the virtual private network 706, and servers 704b used to host services 716 that are managed and provided to customers of a computing service provider.

As illustrated, a virtual private network 706 may include a software development host 708 and a service request router 714. The software development host 708 may be implemented using a computing instance or a physical host. The software development host 708 may include the components described above in association with FIG. 6. A software developer, via a client device 720, may provide input to create, compile, execute, and test development code intended for deployment to the service provider environment 702 using the software development host 708.

The service request router 714 may be implemented using a computing instance or a physical host (e.g., a physical server), and may be configured to perform the functions described earlier. The service request router 714 may be in network communication with an application programming interface ("API") gateway 718 that provides a virtual backplane to the virtual private network 706 and the services 716 in the service provider environment 702. In one example, the service request router 714 may be configured to use a long polling technique (e.g., HTTP long polling) to monitor the API gateway 718 for service requests that are passed through the API gateway 718. Long polling may comprise holding a request for service request information received from the service request router 714 open at the API gateway 718 until new information is available at the API gateway 718. Once available, the API gateway 718 responds and sends the new information to the service request router 714. When the service request router 714 receives the new information, the service request router 714 may send another request for new service request information, thereby repeating the long polling operation. The API gateway 718 may provide application programming interfaces (APIs) for applications (including development code executed on the software development host 708) to access the services 716 in the service provider environment 702.

The various processes and/or other functionality described in association with the figures above may be executed on one or more processors that are in communication with one or more memory modules. The described systems may include a number of computing devices that are arranged, for example, in one or more server banks or computer banks or other arrangements. The computing devices may support a computing environment using hypervisors, virtual machine monitors (VMMs), and other virtualization software. The term "data store", as used herein, may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

Service requests, event notifications, and other network commands may be implemented using API calls, procedure calls, or other types of network commands using various technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The services described above may be centrally hosted functionality or a service application that may receive requests and provide output to other services or consumer devices. For example, services may be considered on-demand computing that are hosted in a server, virtualized service environment, grid or cluster computing system. An API may be provided for each service to enable a second service to send requests to and receive output from the first service. Such APIs may also allow third parties to interface with the services and make requests and receive output from the services. While the figures above illustrate examples of systems that may implement the techniques above, many other similar or different environments are possible. The example environments discussed and illustrated above are merely representative and not limiting.

Figure 8:
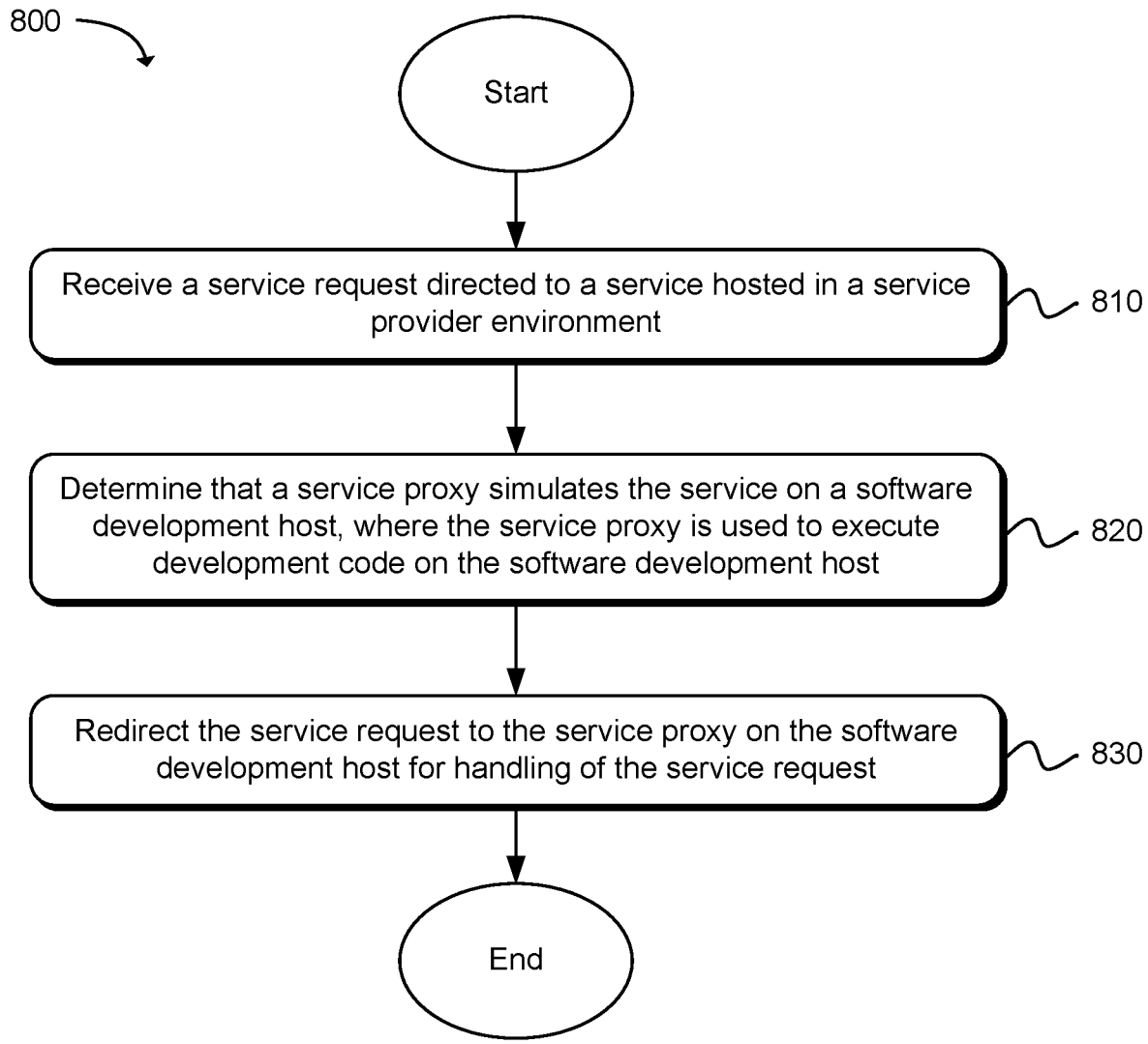
FIG. 8 is a flow diagram illustrating a method for executing development code using a service proxy to simulate a service included in a service provider environment.

FIG. 8 is a flow diagram illustrating an example method 800 for redirecting a service request to a service proxy on a software development host. As in block 810, a service request directed to a service hosted in a service provider environment may be received. In one example, an event may be triggered in the service provider environment causing the service request to be generated and intercepted by a service request router located in the service provider environment.

As in block 820, a determination may be made that a service proxy simulates the service on a software development host, wherein the service proxy may be used to execute development code on the software development host. For example, a determination may be made that the service proxy is located on the software development host. In one example, determining that the software development host includes the service proxy further comprises sending a request to a local agent hosted on the software development host inquiring whether the software development host includes the service proxy. In one example, in the case that a determination is made that the software development host does not include a service proxy for the service hosted in the service provider environment, the service request may be forwarded to the service hosted in the service provider environment.

As in block 830, the service request may be redirected to the service proxy on the software development host for handling of the service request. In one example, receiving the service request at the software development host may cause the service proxy to execute the development code. As an example, in response to receiving the service request at the software development host, an instance of the service proxy may be launched on the software development host and the service proxy may execute the development code on the software development host. Launching the instance may include instantiating a software container on the software development host that includes the service proxy. A software developer may observe execution of the development code using software development tools on the software development host, allowing the software developer to evaluate functionality of the development code.

In one example, executing the development code on the software development host may cause a response to the service request to be generated. The response generated by the development code may be intercepted (e.g., by a local agent) and the response may be sent back to a computing resource that generated the service request. As an illustration, a service proxy used to execute development code on a software development host may generate a response to a service request received from a data storage service, and the response to the service request may be intercepted by a local agent on the software development host and sent back to the data storage service. The local agent on the software development host may facilitate communications between the development code, the service proxy on the software development host, and a service located in the service provider environment.

Figure 9:
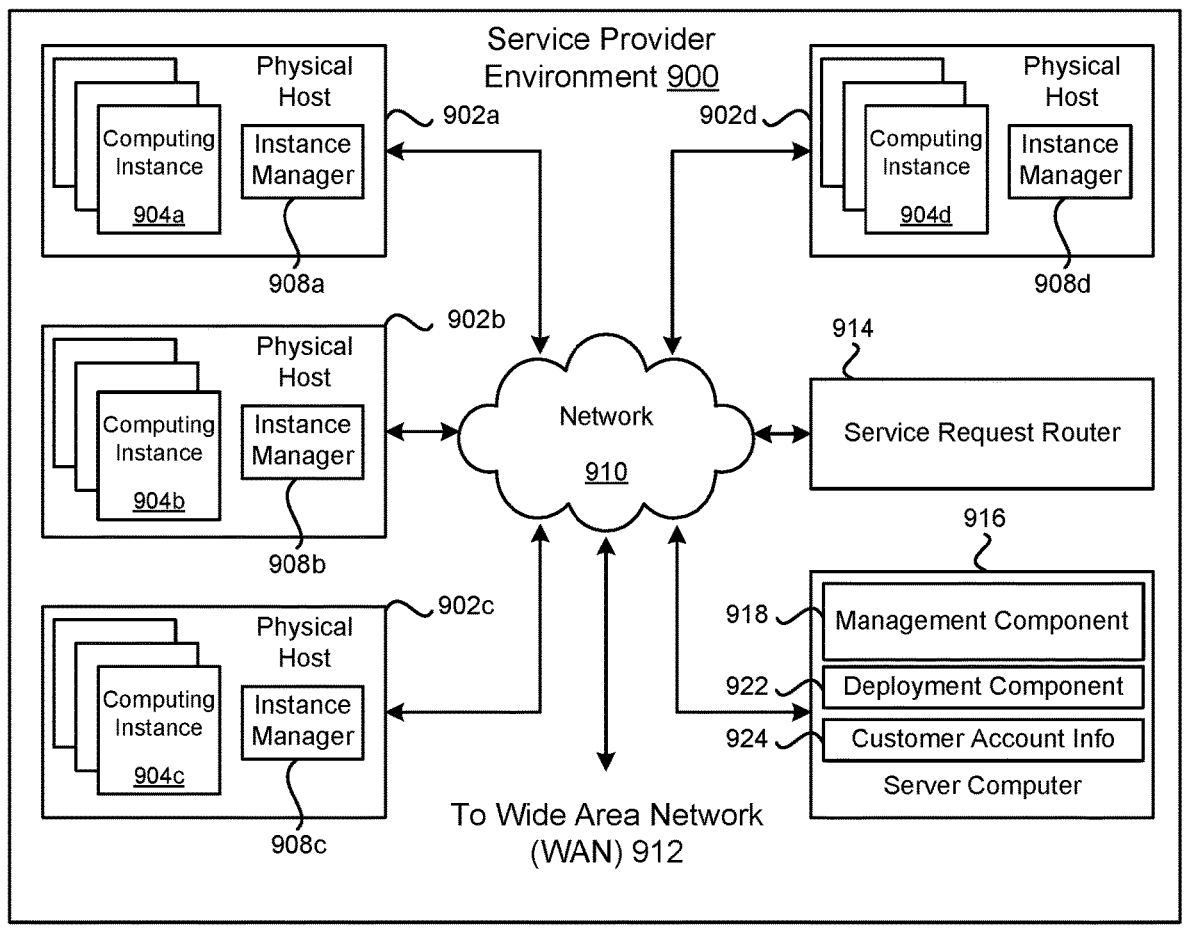
FIG. 9 is a block diagram that illustrates an example service provider environment that includes managed services that may be simulated using service proxies.

FIG. 9 is a block diagram illustrating an example service provider environment 900 that may include computing resources that may include physical hosts 902a-d, computing instances 904a-d, virtualized services, and other types of computing resources which may be available for purchase and use by customers of a computing service provider. The computing resources may have many different configurations of processor capabilities, main memory, disk storage, and operating system. In particular, the service provider environment 900 depicted illustrates one environment in which the technology described herein may be used.

The service provider environment 900 may be one type of environment that includes various virtualized service resources that may be used, for instance, to host computing instances 904a-d. For example, the service provider environment 900 may offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or network services on a permanent or as-needed basis. The computing resources can also include, but are not limited to, computing instances 904a-d and images, security groups, option groups, gateways, option sets, network access control lists ("ACLs"), subnets, storage buckets, network interfaces, snapshots, spot market requests, and storage volumes.

The computing resources described above may be provided in one particular implementation by one or more data centers operated by a service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks 912 ("WANs"), such as the Internet.

The service provider environment 900 may be capable of delivery of computing, storage and networking capacity as a software service to a community of end recipients. In one example, the service provider environment 900 may be established for an organization by or on behalf of the organization. That is, the service provider environment 900 may offer a "private cloud environment." In another example, the service provider environment 900 may support a multi-tenant environment, wherein a plurality of customers may operate independently (i.e., a public cloud environment). Generally speaking, the service provider environment 900 may provide the following models: Infrastructure as a Service ("IaaS"), Platform as a Service ("PaaS"), and/or Software as a Service ("SaaS"). Other models may be provided. For the IaaS model, the service provider environment 900 may offer computers as physical or virtual machines and other resources. The virtual machines may be run as guests by a hypervisor, as described further below. The PaaS model delivers a computing service platform that may include an operating system, programming language execution environment, database, and web server.

Application developers may develop and run their software solutions on the computing service platform without incurring the cost of buying and managing the underlying hardware and software. The SaaS model allows installation and operation of application software in the service provider environment 900. End customers may access the service provider environment 900 using networked client devices, such as desktop computers, laptops, tablets, smartphones, etc. running web browsers or other lightweight client applications, for example. Those familiar with the art will recognize that the service provider environment 900 may be described as a "cloud" environment.

The particularly illustrated service provider environment 900 may include a plurality of server computers 902a-d. While four server computers are shown, any number may be used, and large data centers may include thousands of server computers. The service provider environment 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine monitor (VMM), or another type of program configured to enable the execution of multiple computing instances 904a-d on a single server. Additionally, each of the computing instances 904a-d may be configured to execute one or more applications.

One or more server computers 914 and 916 may be reserved to execute software components for managing the operation of the service provider environment 900 and the computing instances 904a-d. For example, a server computer 914 may execute the service request router described earlier. A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache should be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the service provider environment 900 and the server computers 902*a-d*, 916. The network 910 may be a local area network (LAN) and may be connected to a Wide Area Network (WAN) 912 or the Internet, so that end customers may access the service provider environment 900. The network topology illustrated in FIG. 9 has been simplified, many more networks and networking devices may be utilized to interconnect the various computing systems disclosed herein.

Figure 10:
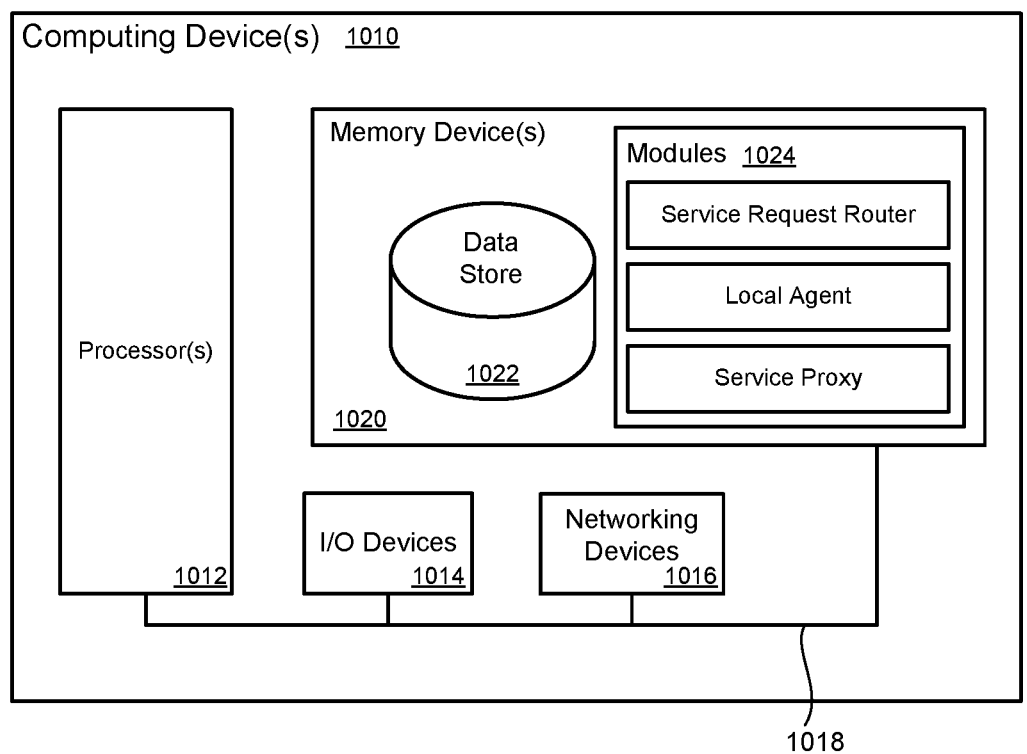
FIG. 10 is block diagram illustrating an example of a computing device that may be used to execute a method for executing development code using a service proxy to simulate a service included in a service provider environment.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. The modules 1024 may execute the functions and services described earlier, including modules for a local agent, a service request router, an integrated development environment, a software container, a service proxy, and other modules. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high-level programming languages that are compiled, interpreted or executed using a hybrid of the methods.

The computing device may also have access to I/O (input/output) devices 1014 that are usable by the computing devices. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the diagrams and flowcharts presented for this technology may imply a specific order of execution, the order of execution may differ from what is illustrated. For example, the order of two more blocks or steps may be rearranged relative to the order shown. Further, two or more blocks or steps shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system, comprising:
    at least one processor;
    a memory device including instructions that, when executed by the at least one processor, cause the system to:
        intercept, by a local agent located on a software development host, a service request directed to a service hosted in a service provider environment, wherein the local agent is configured to redirect the service request to a service proxy located on the software development host when the service proxy is identified as being located on the software development host, wherein redirecting the service request to the service proxy located on the software development host causes the service proxy located on the software development host to initiate execution of development code on the software development host, and wherein the service proxy located on the software development host is used to simulate the service hosted in the service provider environment;
        determine, by the local agent located on the software development host, that the service request is directed to the service hosted in the service provider environment;
        determine, by the local agent located on the software development host, that the service proxy used to simulate the service is located on the software development host; and
        redirect, by the local agent located on the software development host, the service request to the software development host for handling of the service request by the service proxy located on the software development host which initiates execution of the development code on the software development host.

2. The system as in claim 1, wherein receiving the service request at the software development host causes the service proxy located on the software development host to execute the development code on the software development host.

3. The system as in claim 1, wherein the memory device includes instructions that, when executed by the at least one processor, cause the system to further:
    intercept a response to the service request generated by the development code on the software development host executed using the service proxy located on the software development host; and
    direct the response to the service request to a computing resource that generated the service request.

4. A computer implemented method for testing development code in a hybrid development environment, comprising:
    receiving a service request at a local agent located on a software development host, wherein the service request is directed to a service hosted in a service provider environment, wherein the local agent is configured to redirect the service request to a first service proxy located on the software development host when the first service proxy is identified as being located on the software development host, and wherein the first service proxy located on the software development host is used to simulate the service hosted in the service provider environment;
    determining, by the local agent located on the software development host, that the first service proxy located on the software development host which simulates the service is located on the software development host, wherein the first service proxy located on the software development host is used to execute the development code on the software development host; and
    redirecting, by the local agent located on the software development host, the service request to the software development host for handling of the service request by the first service proxy located on the software development host which initiates execution of the development code on the software development host.

5. The computer implemented method as in claim 4, further comprising initiating an event in the service provider environment that causes the service request to be generated.

6. The computer implemented method as in claim 4, wherein determining that the software development host includes the first service proxy further comprises identifying a registration record indicating that the first service proxy is located on the software development host.

7. The computer implemented method as in claim 4, wherein determining that the software development host includes the first service proxy further comprises:

receiving a registration for the first service proxy located on the software development host;

adding the registration for the first service proxy located on the software development host to a registration record; and querying the registration record to determine that the first service proxy located on the software development host is available on the software development host.

8. The computer implemented method as in claim 4, further comprising launching an instance of the first service proxy located on the software development host to execute the development code on the software development host.

9. The computer implemented method as in claim 8, wherein launching the instance of the first service proxy located on the software development host further comprises instantiating a software container on the software development host which provides an isolated environment for the first service proxy located on the software development host by creating a virtual container in which the development code on the software development host and service dependencies are contained.

10. The computer implemented method as in claim 4, wherein the service request is received from a service request router located in the service provider environment, and wherein the service request router redirects the service request originating in the service provider environment to the first service proxy located on the software development host when the first service proxy located on the software development host corresponding to the service request is identified as being located on the software development host.

11. The computer implemented method as in claim 4, wherein the local agent located on the software development host manages the service request by:

causing the first service proxy located on the software development host used to execute the development code on the software development host to be instantiated;

providing the service request to the first service proxy located on the software development host;

intercepting a response to the service request generated by the first service proxy located on the software development host; and directing the response to the service request to a process that generated the service request.

12. The computer implemented method as in claim 4, wherein redirecting the service request to the software development host further comprises pushing the service request to the first service proxy located on the software development host.

13. The computer implemented method as in claim 4, wherein handling of the service request by the first service proxy located on the software development host further comprises using software development tools on the software development host to evaluate functionality of the development code on the software development host.

14. The computer implemented method as in claim 4, wherein the service hosted in the service provider environment is a first service, and further comprising:

receiving a service request generated by the first service proxy located on the software development host used to execute the development code on the software development host, wherein the service request is directed to a second service hosted in the service provider environment;

determining that the software development host includes a second service proxy for the second service hosted in the service provider environment; and providing the service request to the second service proxy located on the software development host.

15. The computer implemented method as in claim 4, wherein the service hosted in the service provider environment is a first service, and further comprising:

receiving a service request generated by the development code on the software development host, wherein the service request is directed to a second service hosted in the service provider environment;

determining that the software development host does not include a second service proxy for the second service hosted in the service provider environment; and forwarding the service request to the second service hosted in the service provider environment.

16. The computer implemented method as in claim 4, wherein the software development host is a client device that is in network communication with the service provider environment and the client device initiates a service request.

17. The computer implemented method as in claim 4, wherein the software development host is hosted in a virtual private network which is logically isolated from services hosted in the service provider environment.

18. A non-transitory machine readable storage medium having instructions embodied thereon, the instructions when executed by one or more processors:

intercept, by a service request router located in a service provider environment, an event notification originating in the service provider environment, wherein the event notification, when redirected by the service request router located in the service provider environment to a service proxy located on a software development host when the service proxy is identified as being located on the software development host, causes the service proxy located on the software development host to initiate execution of development code on a software development host, and wherein the service proxy located on the software development host simulates a service hosted in a service provider environment;

determine, by the service request router located in the service provider environment, that the event notification is directed to the service hosted in the service provider environment;

determine, by the service request router located in the service provider environment, that the service proxy used to simulate the service is located on the software development host; and queue, by the service request router located in the service provider environment, the event notification in a service request queue that is accessible to a local agent located on the software development host configured to retrieve the event notification from the service request queue.

19. The non-transitory machine readable storage medium as in claim 18, wherein the local agent located on the software development host retrieves the event notification from the service request queue and provides the event notification to the service proxy located on the software development host.

20. The non-transitory machine readable storage medium as in claim 18, wherein the local agent located on the software development host facilitates communications between the development code on the software development host, the service proxy located on the software development host, and a service located in the service provider environment.

* * * * *